United States Patent

[11] 3,602,900

[72] Inventors Serge Delaigue
Viroflay (Yvelines);
Roger A. Pain, Vaires (Seine et Marne);
Pierre H. Cogne, Saint Maur (Val de Marne); Louis H. Rieux, Paris, all of, France
[21] Appl. No. 863,604
[22] Filed Oct. 3, 1969
[45] Patented Aug. 31, 1971
[73] Assignee International Standard Electric Corporation
New York, N.Y.
[32] Priority Oct. 25, 1968
[33] France
[31] 171330

[54] SYNCHRONIZING SYSTEM FOR DATA PROCESSING EQUIPMENT CLOCKS
10 Claims, 4 Drawing Figs.

[52] U.S. Cl. .......... 340/172.5
[51] Int. Cl. .......... G06f 15/16, G06f 11/06
[50] Field of Search .......... 340/172.5; 178/69.5; 235/157, 153

[56] References Cited
UNITED STATES PATENTS

| | | | |
|---|---|---|---|
| 3,185,963 | 5/1965 | Peterson et al. | 178/69.5 |
| 3,303,474 | 2/1967 | Moore et al. | 340/172.5 |
| 3,376,385 | 4/1968 | Smith et al. | 178/69.5 |
| 3,402,264 | 9/1968 | Ellis et al. | 178/69.5 |
| 3,471,686 | 10/1969 | Connell | 235/153 |
| 3,493,679 | 2/1970 | Chomicki | 178/69.5 |

*Primary Examiner*—Paul J. Henon
*Assistant Examiner*—Sydney Chirlin
*Attorneys*—C. Cornell Remsen, Jr., Walter J. Baum, Paul W. Hemminger, Percy P. Lantzy, Philip M. Bolton, Isidore Togut and Charles L. Johnson, Jr.

ABSTRACT: In the duplicated data-processing systems, the clock of the "reserve" unit must normally be synchronized with the one of the "inline" unit, as long as this latter operates normally. According to the present invention, the clock of the "inline" unit originates a synchronizing signal periodically, and the clock of the "reserve" unit delimits a synchronization "window." If the synchronizing signal falls into the synchronization window, the setting into synchronism of the "reserve" unit is made. If not, an alarm signal is given. In this arrangement, if the clock of the "inline" unit operates at an abnormal rhythm because of a failure, the clock of the reserve unit will not be synchronized to this abnormal rhythm.

PATENTED AUG 31 1971 3,602,900

SHEET 1 OF 2

Inventors
SERGE DELAIGUE
ROGER ANDRÉ PAIN
PIERRE HENRI COGNE
By LOUIS LÉON HENRI RIEUX
Attorney Inventors
SERGE DELAIGUE
ROGER ANDRÉ PAIN
PIERRE HENRI COGNE
By LOUIS LÉON HENRI RIEUX
Attorney

SYNCHRONIZING SYSTEM FOR DATA PROCESSING EQUIPMENT CLOCKS

BACKGROUND OF THE INVENTION

The invention concerns a system for synchronizing data processing equipment clocks.

In the data processing systems, it is often necessary to provide two processing units, both operating in parallel, for reliability purposes. One of the units, an "in-line" unit, receives input information, and it processes this information into output information. The other unit, a "reserve" unit, receives the same input information as the preceding one, processes this information in identical manner but does not transmit any output information. Operation of both units must be synchronized so that at every instant the reserve unit is in the same condition as the in-line unit, and using the same information. Thus, in the event of any failure of the in-line unit, the reserve unit can be substituted and carry on with the processing at the point where it takes over.

The operation of each of the units is controlled by a clock originating time base signals. The synchronizing of the units, within the foregoing limits, will comprise therefore a synchronization of the clocks.

The clock of the reserve unit will be specifically synchronized with the clock of the in-line unit. However, the synchronizing must not be too rigid, so that the first clock is not disturbed by a failure of the second clock. Indeed, consequent to a failure, the operation frequency of the clock of the in-line unit can vary all of a sudden in such proportion that it becomes incompatible with a normal operation. The in-line unit is then set aside in failure condition and the reserve unit takes its place. During the lapse of time separating the instant the failure occurs and the instant the service is taken over by the reserve unit, the clock of the reserve unit should not follow the abnormal rhythm of the clock of the unit still in-line, but should continue operating in the same way as it did before the failure occurred. Thus, the reserve unit will continue operating at a normal rhythm and will be able to take over, most efficiently, the functions of the in-line unit.

This emergency is however in contradiction with the necessity of establishing synchronism, say for instance, when setting into operation the one, the other or both units, the two clocks are substantially out of phase. The means for synchronization, without necessarily being rigid, must enable a return to the synchronism when the clocks are out of phase.

SUMMARY OF THE INVENTION

The invention provides a system for synchronizing the clocks of data processing equipment responding to these requirements in a simple and reliable manner.

A feature of the invention is a system for synchronizing the clocks of data processing units and comprising, namely, means for generating periodically from a first clock a synchronizing second clock a time interval so-called "synchronization window" framing up the synchronizing impulse which this second clock might generate; and bringing-into-synchronism means, controlled each time that a synchronizing impulse generated by the first clock falls within the limits of the synchronization window of the clock so as to set the second clock into a position defined with respect to position of the first clock—and in these circumstances only—so that the second clock should be synchronized with the first one as long as the rhythms of both clock are neighboring each other; but if, namely, the first clock should operate at an abnormal rhythm, such that the synchronizing impulse would fall outside the synchronization window, the second clock should not any longer be compelled to follow it and thus be able to continue operating at a normal rhythm.

According to another feature of the invention, if the two clocks are in synchronism with each other, the synchronizing impulse generated by the first clock normally appears inside the middle of synchronization window of the second clock; and this will grant, to the possible rhythm differences between the two clocks, the same value in one direction (advancing) as in the other direction (delaying).

According to another feature of the invention, the synchronizing impulse is generated from a position of the first clock, such that in order to enable setting the second clock into synchronism with the first clock it would just be necessary to force this latter into its initial position (zero position); and this simplifies the synchronizing means.

According to another feature of the invention, means are provided so that for each cycle, in the absence of any setting into synchronism, the second clock should jump a certain number of positions and thus go through a more reduced number of positions than the first clock; and this would enable the second clock, namely in the case where both clocks operate at the same rhythm but are time-spaced the one with respect to the other, to catch up the first clock progressively.

According to another feature of the invention, the number of positions jumped by the second clock is less than the number of positions corresponding to the synchronizing window so that, at the approaching of the synchronism, the synchronization impulse might not jump the synchronization area.

It is worth noting, however, that an absolute synchronism of the two units is not required. It may be advisable, in order to enable the reserve unit to substitute the in-line unit and take over the processing at the point where the in-line unit has left it, to limit the authorized delay for the reserve unit to a relatively reduced value, while the advance could have a larger value. It may be of interest therefore to make the setting into synchronism so as to set the reserve unit in advance upon the in-line unit. It is well understood of course that, in other applications, a delay may be considered instead of an advance.

Another feature of the invention is that when set into synchronism, the clock of the reserve unit can be time-spaced with respect to the clock of the in-line unit, and that the synchronization window of the reserve unit clock is centered upon the synchronization impulse that the clock would generate, provided with a time-shift of same value, but in reverse direction; and this enables, at the same time, to systematically time-shift the clock of the reverse unit with respect to the clock of the in-line unit and, taking into account this systematic time shifting, to permit time-spacing differences in the progression of the clocks of a same value for the advancing and the delaying.

BRIEF DESCRIPTION OF THE DRAWINGS

Other features of the invention will become apparent from the description taken in conjunction with the accompanying drawings in which.

DESCRIPTION OF PREFERRED EMBODIMENT

Figure 1:
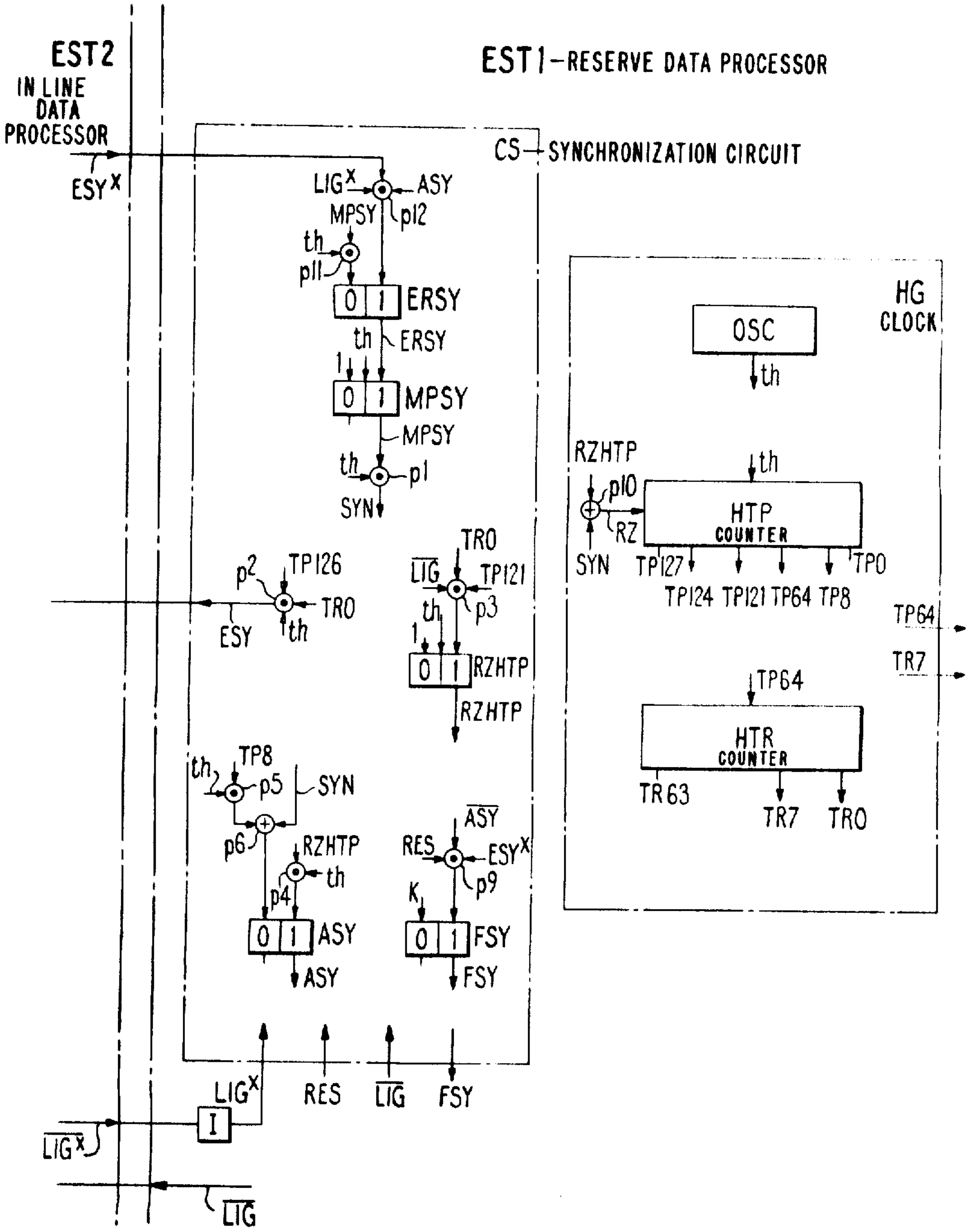
FIG. 1, an example of the circuits of the synchronization system as per present invention.

The device in FIG. 1 comprises the clock HG of a data processing unit EST1 and its synchronization circuit CS. The other unit EST2 was simply indicated in the figure. Its clock and its synchronization circuit, which are not shown in the figure, are identical to those of the unit EST1. The various components of the unit EST2, although not shown in the figure, are designated—for the description purposes—by the same references as those used for the homologous components of the unit EST1, by having an $x$ in exponent. For instance, the clock of the unit EST2 bears the reference $HG^x$, the synchronization circuit bears the reference $CS^x$, etc.

The clock HG is made up of an oscillator OSC and two counters HTP and HTR.

The oscillator OSC provides an impulse *th* every 813 nsec., this being an interval so-called clock period.

The counter HTP is a counter having 128 positions TPO to TP127. It steps one step on the trailing edge of each impulse *th* and provides various impulses every 128 impulses *th*, that is to say every 104.166 μsecs. It will, for instance, provide an impulse TP64 each time it passes into position TP64. It has, moreover, a resetting inlet RZ to which is connected an input OR gate *p*10. This gate is controlled by two signals SYN and RZHTP. Under the control of the one or the other of these two signals, and on the trailing edge of an impulse *th*, the counter can thus be forced into position TPO.

The counter HTR is a counter having 64 positions TRO to TR63. It steps one step on the trailing edge of each impulse TP64 and provides various impulses every 64 impulses TP64, that is every 6.666 msec., this being a duration which corresponds to a clock cycle. It will, for instance, provide an impulse TR7 each time it passes into position TR7.

The impulses TP64 and TR7 are transmitted to the data processing unit in order to have this latter's operation rhythmed.

Now will be described the operating process of the synchronization system, object of the present invention, by referring to FIG. 2, as well as to FIG. 1.

It will be assumed that the unit EST2 is in line and that the unit EST1 is in reserve.

The in-line unit, EST2, transmits a synchronizing impulse $ESY^x$, once per each cycle of its clock, when its counter $HTR^x$ is in position TRO, when its counter $HTP^x$ is in position TP126 and when its oscillator $OSC^x$ provides an impulse $th^x$. This is illustrated by the first three lines in FIG. 2.

The reserve unit, EST1, delimits a synchronization window ASY, once every cycle of its clock. This window opens when its counter HTR is in position 0, its counter HTP is in position TP122, and its oscillator OSC provides an impulse *th*. It can keep lasting up to nine clock periods. This is illustrated by the three lines EST1 of FIG. 2 concerning a case of operation in which the clock HG is in exact synchronism with the in-line clock $HG^x$. It can immediately be seen that the synchronization window is then practically centered upon the synchronization impulse of the other unit.

However, if the clock of the in-line unit tends to take up some advance or some delay with respect to the clock of the reserve unit, or vice versa, the impulse $ESY^x$ will move aside from the center of the window into one direction or the other; and it will even be able, if the difference between the frequencies of the two oscillators is too large, to appear outside the window. Same will take place when, at the setting into operation of one of the units, the two clocks are time-spaced, although they operate at nearly the same frequencies.

According to the system of the present invention, the clock of the reserve unit is set into a well determined position, which is then the same as the one of the in-line unit, by means of a control order (SYN, FIG. 1) initiated at the reception of the synchronization impulse ($ESY^x$) sent by the in-line unit, if the synchronization window (ASY) is then open. This means that at each cycle, any time-shift between the two clocks will be corrected on condition that it does not exceed certain limits defined by the synchronization window. If the time-shift is too large, the setting into synchronism is not made and the clock of the reserve unit does not risk being disturbed by the clock of the in-line unit.

Figure 2:
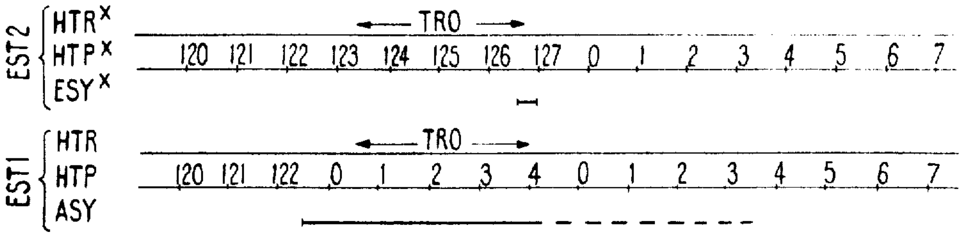
FIG. 2, a general timing diagram of the system in FIG. 1.

As illustrated in FIG. 2, the counter HTP of unit EST1 is switched from position TP122 to position TPO, at the beginning of the synchronization window. It then progresses until the setting into synchronism is operated, by a further forcing into position TPO. If the setting into synchronism does not take place because the time-shift between the two clocks is too large, the counter HTP simply continues to progress. The clock of the reserve unit thus jumps directly, at each cycle, from position TRO, TP122 to position TRO, TPO; and, it accomplishes thus 5 steps less than the clock of the in-line unit which goes up to TRO, TP127. Because of that fact, this arrangement has for result, in the case where the two clocks are desynchronized, to enable the reserve unit to gain progressively some advance with respect to the in-line unit, until it recovers the synchronism. It is worth noting furthermore that the advance gained at each cycle by the clock of the reserve unit is relatively small with respect to the duration of the cycle, and this does not affect much its duration; also, that it is smaller than the synchronization window; and this would prevent that, at the approaching of the synchronism, this window should be jumped.

By referring to FIGS. 1, 3 and 4, a detailed description will now be given of the process of synchronization of the units.

The circuit CS shown in FIG. 1 is realized by means of gates and of bistables.

An AND gate is shown, in this figure, by a circle containing a dot in its center, and an OR gate by a circle containing a cross.

A bistable, such as ASY, is shown by two juxtaposed squares containing the digits 0 and 1. It has two input conductors placed at its upper part and two outlets placed at its lower part. When the bistable is in 0, it provides a positive signal upon its left outlet and no signal (earth) on its right outlet ASY. To have it pass onto position 1 it is just necessary to provide it with a positive signal on its right inlet. The output signals are then permuted. In order to have it restore into its 0 position, it is just necessary to provide it with a positive signal on its left inlet. The duration of the input signals does not matter. The change of condition of the bistable happens right at the start of the input signal, in a very short time which can be considered as null.

A bistable, such as RZHTP, is shown in the figure in the same way as the above bistable ASY. It comprises, in addition, a third inlet placed at its upper part, between the two other inlets, so as to receive a triggering signal. To have it trigger from position 0 onto position 1, it is necessary to provide it with a positive signal on its right inlet and with a positive triggering signal on its third inlet. It triggers on the rear edge of the triggering signal on condition that the signal be always present on the right inlet. The triggering from position 1 to position 0 is made, in the same way, by providing a signal on the left inlet and a triggering signal on the third inlet. As before, the bistable provides a positive signal, on its left outlet, when it is in position 0 and it does not provide any signal on its right outlet. In position 1, the output signals are changed over. Moreover, if a positive signal is present on both the left and right inlets it triggers into the position opposite to the one in which it happens to be, upon the rear edge of the triggering signal.

Figure 3:
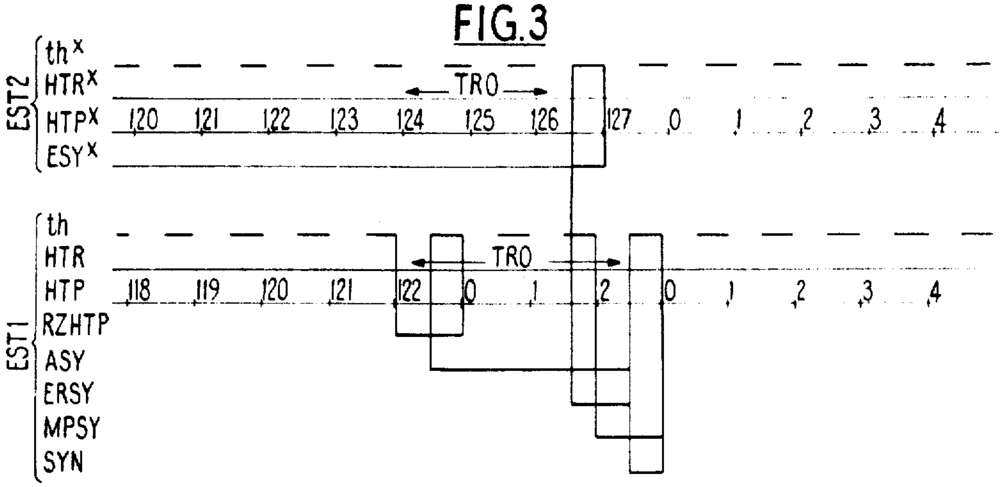
FIG. 3, in the case wherein the time-space between the clocks of the two units enables effecting a synchronization.

FIG. 3 shows the operation diagrams of the clocks and of the synchronization circuits of both units EST1 and EST2 and of the signals emitted at various points in the circuits, in case clock EST1 is time-shifted backwards with respect to the clock of EST2, and wherein the synchronization can be realized. The operation diagram of unit EST2 is being shown at the upper part of the figure, and the operation diagram of EST1 at the lower part.

Figure 4:
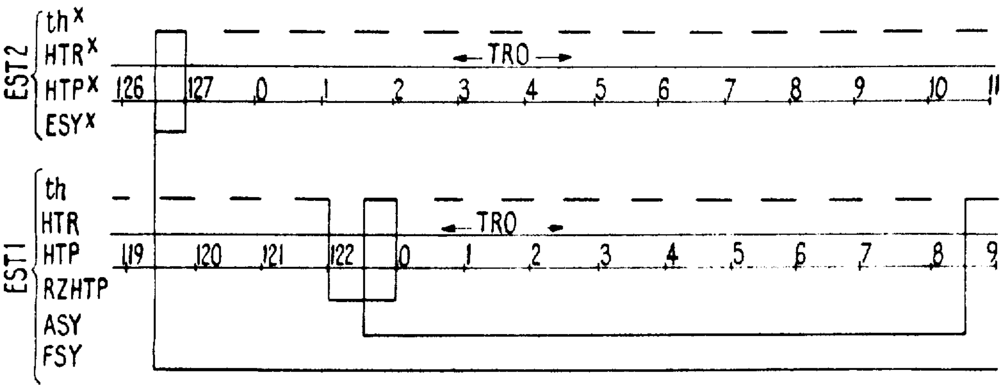
FIG. 4, an operating timing diagram of the system in FIG. 1, in the case wherein the time-space between the clocks of the two units does not enable effecting a synchronization.

FIG. 4 shows operation diagrams, same is the ones above, in the case where the clock of EST1 is time-shifted backwards with respect to the clock of EST2, and, where the synchronization cannot be realized.

The unit EST1 is in reserve. It provides a signal RES and a signal $\overline{LIG}$ to its synchronization circuits CS. It also emits the signal $\overline{LIG}$ onto the unit EST2 to inform it that it is not in line. The unit EST2 being in line does not emit the signal $\overline{LIG}^x$. In unit EST1, the signal $\overline{LIG}^x$ being absent, the inverter I produces the signal $LIG^x$.

All the bistables of the circuits CS and $CS^x$ of both units are in position 0.

The oscillators of both units operate and provide impulses *th* and $th^x$. The counters HTP, HTR, $HTP^x$ and HTR operate as was described above.

It is first assumed that the clock of unit EST1 is time-shifted backwards, with respect to the clock of unit EST2, by about two positions from the counter HTP. This case of operation is shown by the diagram in FIG. 3.

In the unit EST1 at the end of a cycle of the clock HG, the counter HTR passes onto position TRO. It emits the signal TRO. When the counter HTP reaches position TP121, it provides the signal TP121. The signals TRO, TP121 and $\overline{LIG}$ are present at the inputs of gate *p3* of the circuit CS. The gate *p3* operates and provides a signal on the right inlet of the bistable RZHTP.

On the rear edge of the next impulse *th*, that is to say when the counter HTP passes onto position TP122, the bistable RZHTP triggers into position 1. The signal RZHTP (line RZHTP of FIG. 3) provided on the right outlet of the bistable RZHTP is applied to one of the inlets of gate *p4*.

At the next impulse *th*, the gate *p4* operates and provides a signal on the right inlet of bistable ASY. The bistable ASY triggers into position 1 and provides the signal ASY (line ASY of FIG. 3) which determines the synchronization window. The signal RZHTP is also applied to the gate *p10*. The gate *p10* operates and provides a signal to the inlet RZ of counter HTP. The counter HTP is forced from position TP122 to position TPO, on the rear edge of impulse *th* instead of passing into position TP123. Moreover, the counter HTP not being any longer in position TP121, does not provide any more the signal TP121. The gate *p3* is disabled. At the end of this impulse *th*, the signal 1, applied permanently to the left inlet of bistable RZHTP, controls the triggering of this latter into position 0.

In the unit EST2, when the counter $HTP^x$ of the unit in line EST2 comes into position TP126, it sends a signal TP126. Likewise, in position TRO, the counter $HTR^x$ sends a signal TRO. The signals TP126, TRO, and an impulse $th^x$ are set in coincidence at the inlets of an AND gate, identical to the gate *p2* of the circuit CS of EST1 shown in FIG. 1. The AND gate provides, in exchange, a signal $ESY^x$ (line $ESY^x$ of FIG. 3) to the unit EST1.

The circuit CS of unit EST1 thus receives the signal $ESY^x$. The signals ASY, $ESY^x$ and $LIG^x$ are provided to the inlets of gate *p12*. The gate *p12* operates and provides a signal on the right inlet of bistable ERSY. This latter triggers into position 1 and provides the signal ERSY to the right inlet of bistable MPSY (line ERSY of FIG. 3). At the end of the next impulse *th* the bistable MPSY triggers into position 1 and provides the signal MPSY (line MPSY of FIG. 3).

At next impulse *th*, the gate *p1* operates and provides the signal SYN (line SYN of FIG. 3). This signal is applied to the input gate *p10* of the counter HTP. The gate *p10* operates and provides a signal RZ to control the setting into synchronism. The signal SYN is also applied to an inlet of gate *p6* and, because of this, also to the left inlet of the bistable ASY. The bistable ASY triggers into position 0. The signal ASY is therefore no longer provided. The gate *p12* is disabled. Moreover, the bistable MPSY being in position 1, the signal MPSY is provided. The gate *p11* operates therefore and applies a signal on the left inlet of the bistable ERSY. The bistable ERSY restores to position 0. At the end of the present impulse *th*, the counter is synchronized, that is to say, it is restored to position TPO. Due to this, as is seen in FIG. 3, the counters HTP and $HTP^x$ of both units happen to be synchronized, the position TPO of both counters being substantially in coincidence.

The rear edge of this impulse *th* also controls the triggering into position 0 of the bistable MPSY, since a positive signal 1 is applied permanently on its left inlet. The synchronization circuits of both units are thus again in their initial condition.

It will now be assumed that the clock of the unit EST1 is time-shifted backwards, with respect to the clock of the unit EST2, by seven positions from the counter HTP. This is, here, the case of the operating process shown by the diagrams in FIG. 4.

In the unit EST2, when the clock is at the end of cycle ($HTR^x$ in position TRO) and that the counter $HTP^x$ is in position TP126, it provides the synchronization impulse $ESY^x$ to the unit EST1 (line $ESY^x$ of FIG. 4).

This impulse $ESY^x$ is received in the unit EST1, but is blocked by the gate *p12*, the condition ASY not being provided. However, the gate *p9* becomes conducting since the logic conditions RES.$ESY^x$ .$\overline{ASY}$ are met at its inlets. It provides a signal which is retransmitted to the right inlet of bistable FSY. The bistable FSY triggers into position 1. The signal FSY (line FSY of FIG. 4) is provided and is retransmitted to the unit EST1 so as to indicate that the synchronization could not be realized. The signal $ESY^x$ then disappears. The gate *p9* is disabled, but the bistable FSY remains in position 1 until a signal K, provided by means not shown (when the error will have been registered, for instance), will make it trigger into position 0.

When the counter HTP of clock EST1 reaches position TP121, it provides a signal TP121. The signals TRO, TP121 and $\overline{LIG1}$ are present at the inlets of the gate *p3* of circuit CS. The gate *p3* operates and provides a signal on the right inlet of bistable RZHTP. As described above, the bistable RZHTP triggers into position 1, controls the triggering of bistable ASY into position 1, the passing of counter HTP from position TP122 to position TPO, and then restores to position 0.

The counter HTP steps up to position TP8 wherein it provides the signal TP8. At the beginning of the impulse *th*, which follows the passing into position TP8, the gate *p5* operates and provides a signal which is retransmitted by the OR gate *p6* to the left inlet of bistable ASY. The bistable ASY restores to position 0.

It is seen, therefore, that the synchronization has not been made, but, by having the counter HTP1 pass from position TP122 to position TPO, the delay of the clock of ST1 with respect to the clock of EST2 is reduced by five positions from HTP and is brought back to two positions. At the next cycle of the clocks, it would therefore be possible to effect the synchronization.

Now will be examined the case where, in order to enable the reserve unit ST1 to substitute the in-line unit EST2 and to take up the processing at the point where the in-line unit EST2 has left it, it will be necessary to limit the delay, of the clock of EST1 with respect to the clock of EST2, by a relatively reduced value; whereas its advance could take a larger value.

A simple solution would consist in shifting in consequence thereof the synchronization window, but that would limit the allowed space of progression, during a clock cycle, in one of the two directions; however this is not to be wished for. It was considered, therefore, according to the present invention, to time-shift forward the clock of EST1 at each setting into synchronism, so as to restore the equality of the allowed spaces of progression. The clock of EST1 will thus benefit, for the synchronization, of the allowed delay increased by the initial advance, which is a time-space that is equal to the allowed advance diminished by the initial advance. To this end, it is just necessary, without changing anything elsewhere, that the impulse ESY be created when the counter HTP is in position on TP124, instead of TP126; same will take place for $ESY^x$. Because of this, the clock of EST1 will be time-shifted forward by two positions of the counter HTP, with respect to those indicated by the FIGS. 2 and 3. Subsequently, if no progression deviation occurs, the synchronization window (ASY) will be produced two clock periods earlier, because of the initial advance, and the signal $ESY^x$ will show itself in the middle of this window. The allowed progression differences, backwards and forward, would therefore indeed be equal.

We claim:

1. A synchronization system method for clocks of data processing units comprising the steps of:

periodically producing a synchronization impulse from a first clock;

delimiting, from a second clock, a time interval synchronization window for framing the synchronization impulse that this second clock may produce; and setting into synchronism said second clock each time that a synchronization impulse produced by the first clock comes within the limits of the synchronization window of the second clock, so as to set the second clock into a position identical to the one of the first clock, whereby, the second clock is not synchronized with the first clock when the synchronization impulse from the first clock falls outside the synchronization window and the second clock continues to operate at its own rhythm.

2. The method according to claim 1 including the step of generating the synchronizing impulse from a position of the first clock which forces the second clock into its initial position.

3. The method according to claim 2 including the step of jumping a certain number of positions by said second clock to enable it, in the case where both clocks operate at the same rhythm but are time-spaced the one with respect to the other, to catch up the first clock progressively.

4. The method according to claim 3 including the step of limiting the number of positions jumped by the second clock to less than the number of positions corresponding to the synchronizing window so that, upon approaching of synchronism, the synchronization impulse does not jump the synchronization area.

5. The method of claim 4 including the steps of time-spacing during synchronism, the clock of the reserve unit with respect to the clock of the in-line unit, so that the synchronization window of the reserve unit clock is centered upon the synchronization impulse that the clock would generate with a time-shift of same value, but in a reverse direction; and time-shifting at the same time, the clock of the reserve unit with respect to the clock of the in-line unit, to permit time-spacing differences in the progression of the clocks of a same value for advancing and delaying.

6. A synchronization system for clocks of data processing units comprising:

means for periodically producing a synchronization impulse from a first clock;

means for delimiting, from a second clock, a time interval synchronization window for framing the synchronization impulse that this second clock may produce; and means for the setting into synchronism said second clock which is controlled by a synchronization impulse produced by the first clock when its impulse comes within the limits of the synchronization window of the second clock, so as to set the second clock into a position identical to the one of the first clock, whereby the second clock is synchronized with the first one when the rhythm of both clocks are similar such that the synchronization impulse from the first clock falls inside the synchronization window of the second clock.

7. The system according to claim 6 including means for generating the synchronizing impulse from a position of the first clock, such that in order to set the second clock into synchronism with the first clock, the second clock is forced into its initial position.

8. The system of claim 7 including means to cause the second clock to jump a certain number of positions and go though a more reduced number of positions than the first clock; and means to progressively cause the second clock to catch up to the first clock in the case where both clocks operate at the same rhythm but are time-spaced the one with respect to the other.

9. The system of claim 8 wherein the number of positions jumped by the second clock is less than the number of positions corresponding to the synchronizing window so that, at approaching synchronization, the synchronization impulse does not jump the synchronization window.

10. The arrangement of claim 9 including synchronism means for the clock of the reserve unit to be time-spaced with respect to the clock of the in-line unit, so that the synchronization window of the reserve unit clock is centered upon the synchronization impulse that the clock would generate with a time-shift of same value, but in reverse direction; and means to systematically time-shift the clock of the reserve unit with respect to the clock of the in-line unit to permit time-spacing differences in the progression of the clocks of a same value for advancing and delaying.